United States Patent [19]

Remley

[11] 4,003,016

[45] Jan. 11, 1977

[54] DIGITAL BEAMFORMING SYSTEM

[75] Inventor: Winslow Rodeck Remley, Fairfax, Va.

[73] Assignee: The United States of America as represented by the Secretary of the Navy, Washington, D.C.

[22] Filed: Oct. 6, 1975

[21] Appl. No.: 619,720

[52] U.S. Cl. .................................................. 340/6 R

[51] Int. Cl.[2] .................................................. G01S 3/80

[58] Field of Search ............. 340/6 R, 1 R; 343/118

[56] References Cited

UNITED STATES PATENTS

| | | | |
|---|---|---|---|
| 3,370,267 | 2/1968 | Barry | 340/6 R |
| 3,803,543 | 4/1974 | Cioccio | 340/6 R |
| 3,860,928 | 1/1975 | Ehrlich | 340/6 R X |

*Primary Examiner*—Richard A. Farley
*Attorney, Agent, or Firm*—Richard S. Sciascia; Arthur A. McGill; Prithvi C. Lall

[57] ABSTRACT

Each ring of a two ring transducer array provides signals that are bandpassed filtered and hard-clipped. These signals are sampled in parallel at a predetermined frequency. The sampled signals are conducted to Adder circuits with appropriate delays being applied to predetermined signals. By sequentially changing the signals having a delay inserted and those applied directly to the Adder a 360° azimuthal scan is provided in discrete angular steps. The sums of Adders of each ring are then combined. The system provides scans in the horizontal direction and at predetermined depression-/elevation angles.

4 Claims, 5 Drawing Figures

DIGITAL BEAMFORMING SYSTEM

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION

The present invention generally relates to beamforming systems and more particularly to apparatus for digital beam-forming utilizing inputs from a large array of transducers.

Digital multibeam steering referred to as DIMUS is a processing technique using independent electrical signals from hydrophone elements. The signals are clipped and then used to drive respective shift registers. The shift registers are used as time delays. To form an electrical beam at a specified angle the appropriate stage on each shift register is selected for providing the travel time delay of the signal as it passes the respective hydrophone.

The straight forward implementation of the above system requires each hydrophone to have its own respective shift registers for providing time delay with no shared use of components.

SUMMARY OF THE INVENTION

It is therefore a general object and purpose of the present invention to provide an improved digital beamforming system. It is a further object to provide a system requiring fewer components then previous digital systems. It is another object that the digital beamforming system provide precise information with elimination of time delay approximations. An additional object is that the invention be lower in cost due to the aforementioned fewer components being required. These and other objects of the invention and the various features and details of construction and operation will become apparent from the specification and the drawings.

This is accomplished in accordance with the present invention by providing a ring multiplexing technique to transducer arrays that exhibit ring symmetry in horizontal planes with each ring having the same number of effective elements. Multiplexed signals are provided to a plurality of delay and non-delay lines to be further added at precise predetermined intervals to give a horizontal and depression/elevation scan in the area of the arrays.

DESCRIPTION OF THE PREFERRED EMBODIMENT

A digital beamforming system provides a means of digital beamforming using inputs from a large array of transducers. N quantized and sampled signals are accepted from N transducers and formed into K beams in azimuth and depression/elevation angle. The system is compatible with transducer arrays which are cylindrically symmetrical, or can be made to appear cylindrically symmetrical by combining signals from a plurality of transducer. For sonar applications a hard-clipped analog to digital converter is sufficient and desirable. This type of beamforming is called DIMUS for digital multibeam steering.

Figure 1:
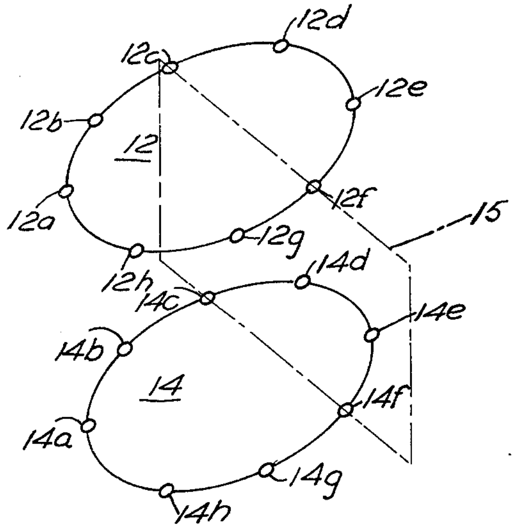
FIG. 1 is a view of the transducer arrays of the present invention.

Referring now to FIG. 1 there is shown for illustration purposes an array 10 made up of two parallel horizontal rings 12 and 14, vertically spaced from each other. Each ring 12 and 14 have eight transducers 12*a–h* and 14*a–h*, respectively. Plane 15 represents a wavefront that has passed by respective transducers 12*d*, 12*e*, 14*d* and 14*e* and has reached transducers 12*c*, 12*f*, 14*c* and 14*f*. The transit time between the *d–e* and *c–h* transducers is 5*t*.

Figure 2:
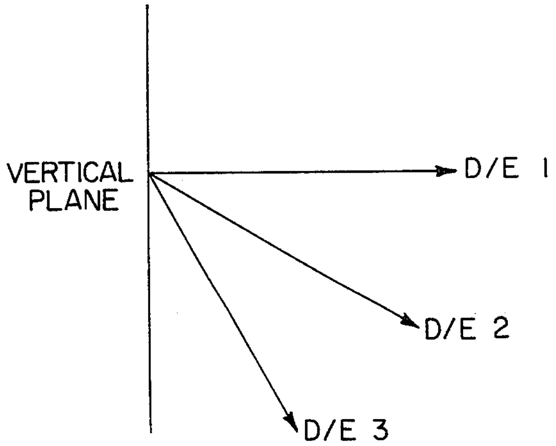
FIG. 2 is a graph representing the depression/elevation angle of the wavefront of FIG. 1.

This is at the depression/elevation angle D/E 1 shown in FIG. 2. The transit time for D/E 2 between the same groups of transducers is 4*t*, and for D/E 3 is 2*t*.

Figure 3:
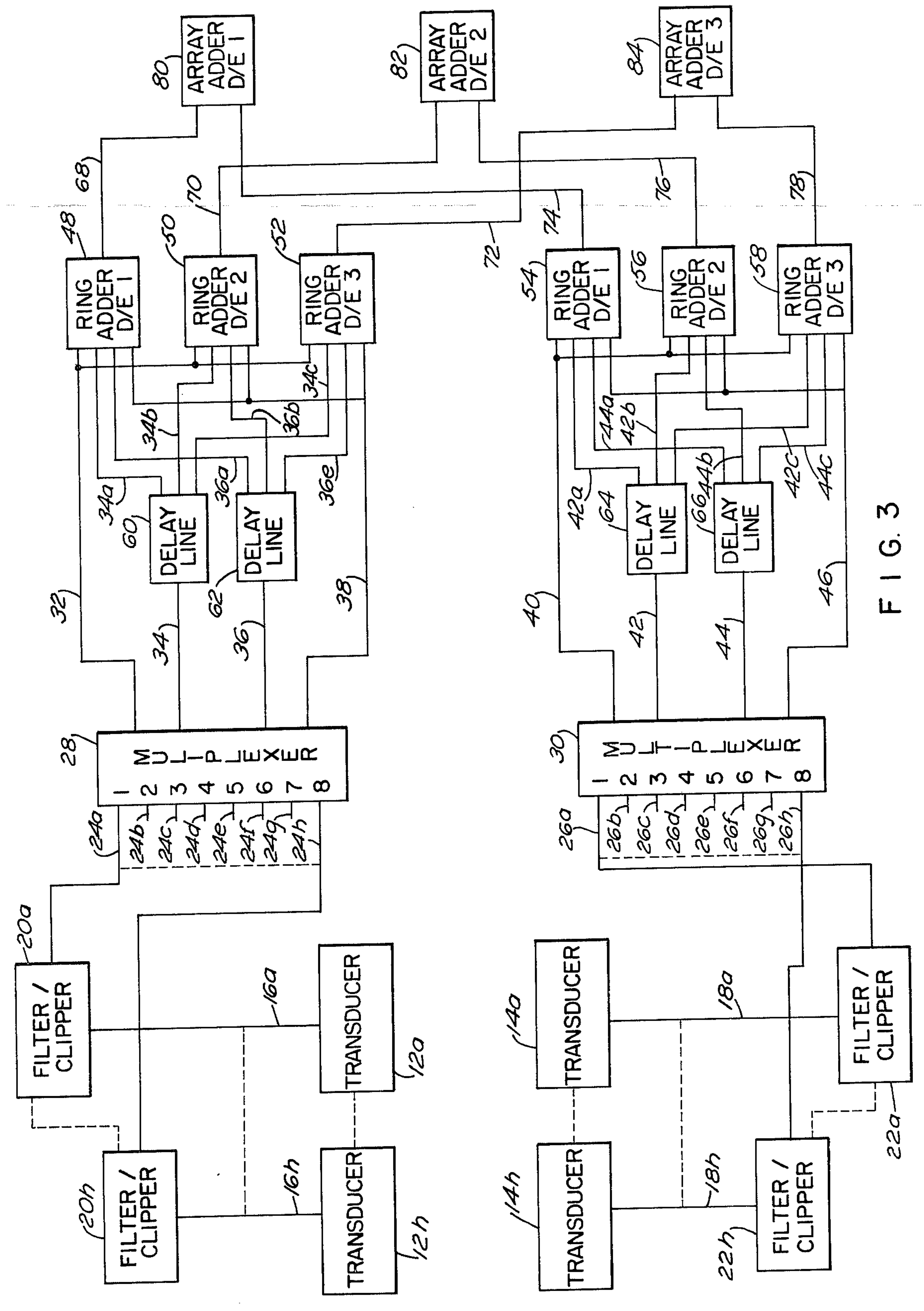
FIG. 3 is a block diagram of the signal processing system of the present invention.

In FIG. 3, the plurality of transducers 12*a–h*, inclusive, supply signals over respective lines 16*a–h*, to filter/clippers 20*a–h*, inclusive. The hardlimited or clipped signals are individually supplied to multiplexer 28 via lines 24*a–h* inclusive. Four of the eight input signals are simultaneously supplied to output lines 32, 34, 36 and 38. These signals are supplied at predetermined intervals and sequence to be explained later. The signals over lines 32 and 38 are supplied directly to adders 48, 50 and 52. The signals from lines 34 and 36 are supplied to ring adders 48, 50 and 52 via respective delay lines 60 and 62 and conductors 34*a–c* and 36*a–c*. The delay lines 60 and 62 and their operation are further explained later.

The signals from transducers 14*a–h* are processed in a similar manner via lines 18*a–h*, filter/clippers 22*a–h*, lines 26*a–h*, multiplexer 30, lines 40, 42, 42*a–c*, 44, 44*a–c*, and 46, ring adders 54, 56 and 58, delay lines 64 and 66.

The outputs from ring adders 48 and 54 at D/E 1 are then supplied to array adder 80 over lines 68 and 74. In a similar fashion the outputs from respective ring adders D/E 2 and D/E 3 are supplied over lines 70, 76, 72 and 78 to respective array adders 82 and 84.

Figure 4:
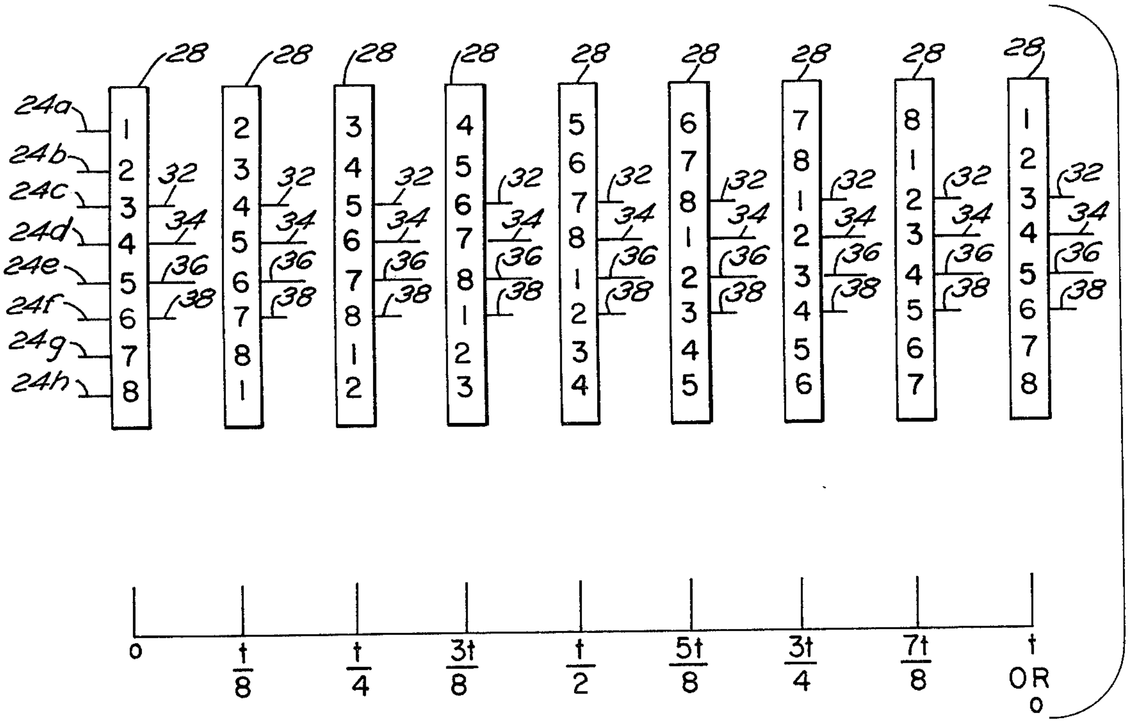
FIG. 4 shows the timing sequence of a selected multiplexer of FIG. 3.

FIG. 4 shows the sequential operation of multiplexer 28 of FIG. 3. The operation of multiplexer 30 is identical and for simplicity sake is not shown. Signals to multiplexer 28 are continuously supplied over lines 24*a–h*. The outputs, however, are supplied sequentially to lines 32, 34, 36 and 38 at time intervals t/8. At time 0, signals are supplied from multiplexer 28 at outputs 3, 4, 5, and 6. At time t–/8, signals are supplied from multiplexer 28 at outputs 4, 5, 6 and 7 etc. This gives rise to the terms "ring around the rosy" or "merry-go-round" associated with the beamforming technique. Snapshots of the outputs illustrate the input loading and delay loading sequence.

Figure 5:
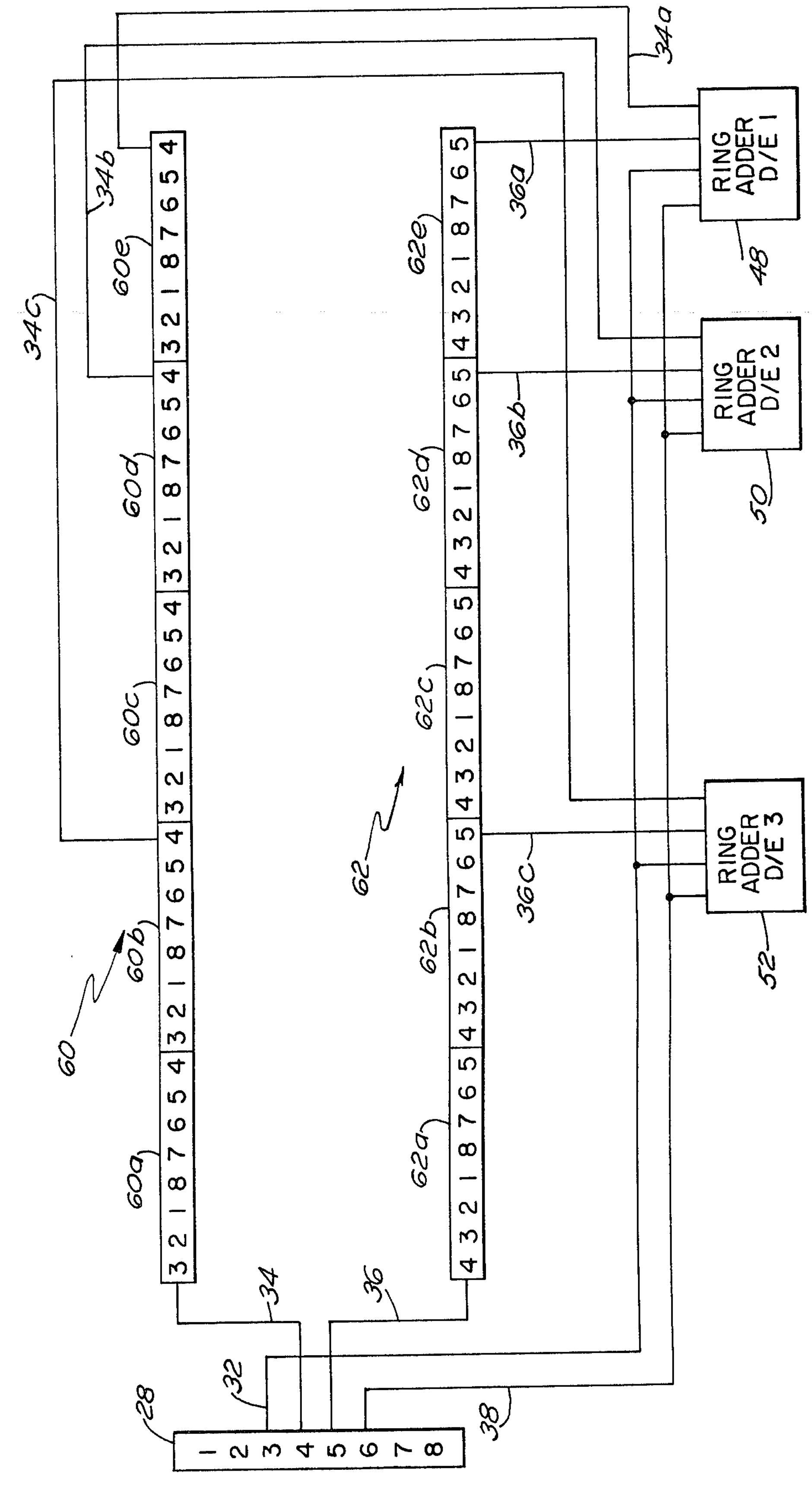
FIG. 5 shows the timing sequence of selected delay lines of FIG. 3.

In FIG. 5 there is a more detailed showing of delay lines 60 and 62. The delay lines are made up of integral multiple shift registers 60*a–e* and 62*a–e* requiring time for a sample to traverse each unit such as shift register 60a. The number of bits per unit is equal to the number of transducers per ring. In the present case the delays for D/E 3, D/E 2 and D/E 1 are respectively 2*t*, 4*S* and 5*t*. Thus, for example, at the clock time shown in FIG. 5 the signals applied to ring adder D/E 1 48 are the real time signals from outputs 3 and 6 of multiplexer 28 and the output signals 4 and 5 that emanated a period of 5*t* ago from multiplexer 28. The operations of delay lines 64 and 66 are identical and for simplicity sake are not shown. In this way a single wavefront is seen at all times by the ring adders.

The operation of the device is described for time 0 at D/E 1. Signals from all transducers 12*a–h* and 14*a–h* are applied to respective filter/clippers 20*a–h* and 22*a–h*. The filter/clipper outputs are applied to respective multiplexers 28 and 30. Ring adders D/E 1 48 and 54 receive the signals direct from bits 3 and 6 of respective multiplexers 28 and 30. In addition adders 48 and 54 receive bits 4 and 5 that have been delayed for a period of 5*t* at respective delay lines 60, 62, 64 and 66. The signals from ring adders D/E 1 48 and 54 are then applied to D/E 1 array adder 72.

There has therefore been described a DIMUS system using less than half the circuitry required for straight forward implementation. This is accomplished through the sharing of a plurality of components.

It will be understood that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. A signal processing system comprising:

a plurality of transducers for providing a plurality of respective output signals, said transducers arranged to form an array exhibiting ring symmetry;

a plurality of filtering and clipping means to filter and clip respective transducer output signals;

a multiplexer having a plurality of input terminals, each of said multiplexer input terminals connected to a respective member of said plurality of filtering and clipping means for receiving filtered and clipped signals, said multiplexer having a plurality of output terminals that is less in number than said input terminals, each of said output terminals adapted for sequentially providing said filtered and clipped signals simultaneously at predetermined intervals;

at least one pair of delay lines connected to respective members of a pair of selected multiplexer output terminals, said pair of delay lines adapted to delay received signals for a simultaneous predetermined period of time; and an adder connected to said pair of delay lines for receiving the delayed signals and connected directly to a second pair of selected multiplexer output terminals.

2. A signal processing system according to claim 1 wherein said delay lines comprise a plurality of shift registers.

3. A signal processing system comprising:

a plurality of transducer rings with each of said rings including a transducer array exhibiting ring symmetry and having an identical number of transducer elements;

a plurality of filtering and clipping means adapted to filter and clip respective transducer element output signals;

a plurality of multiplexer units, each of said units having a plurality of input terminals connected to a respective member of said plurality of filtering and clipping means for receiving filtered and clipped signals from the same transducer ring, each of said multiplexer units having a plurality of output terminals that is less in number than said input terminals, each of said output terminals adapted for sequentially providing said filtered and clipped signals at predetermined intervals;

a plurality of delay lines connected to a first plurality of selected multiplexer output terminals of each of said multiplexer units, said delay lines adapted to delay each received signal for a plurality of predetermined time intervals;

a first plurality of adders with each adder connected to one of said multiplexers and a plurality of said delay lines, so as to have each adder receive and add signals from a plurality of transducers on one of said plurality of transducer rings to form a signal indicative of a wavefront at a predetermined elevation angle received by the one of said plurality of transducer rings; and a second plurality of adders connected to said first plurality of adders so as to sum respective signals of the same elevation angle.

4. A signal processing system according to claim 3 wherein said delay lines comprise a plurality of shift registers.

* * * * *